United States Patent [19]

Dammeyer

[11] 4,280,205
[45] Jul. 21, 1981

[54] ULTRASONIC FORK HEIGHT MEASURING APPARATUS

[75] Inventor: Ned E. Dammeyer, New Bremen, Ohio

[73] Assignee: Crown Controls Corporation, New Bremen, Ohio

[21] Appl. No.: 57,772

[22] Filed: Jul. 16, 1979

[51] Int. Cl.³ .................... G01S 11/00; B66B 3/02
[52] U.S. Cl. ............................. 367/119; 367/127; 187/9 E; 116/226
[58] Field of Search .............. 367/118, 127, 140, 151, 367/117, 119; 33/1 P, 125 W; 116/226

[56] References Cited

U.S. PATENT DOCUMENTS

| 2,790,513 | 4/1957 | Draxler | 187/9 E |
| 3,319,816 | 5/1967 | Christenson | 187/9 E |
| 3,554,013 | 1/1971 | Berg | 73/67.7 |
| 4,146,869 | 3/1979 | Snyder | 367/151 |

Primary Examiner—Richard A. Farley
Attorney, Agent, or Firm—Biebel, French & Nauman

[57] ABSTRACT

The height to which the forks of a lift truck are raised is measured by an ultrasonic height measuring arrangement including a downward facing transmitting transducer, positioned on the truck platform in fixed position with respect to the forks, and a downward facing ultrasonic receiving transducer which receives ultrasonic acoustic energy waves reflected by an upward facing parabolic reflector. The receiving transducer is positioned in a casing substantially at the focal point of the parabolic reflector and is mounted by means of springs which provide vibration isolation between the casing and the transducer.

14 Claims, 5 Drawing Figures

ULTRASONIC FORK HEIGHT MEASURING APPARATUS

BACKGROUND OF THE INVENTION

The present invention relates generally to ultrasonic distance measuring apparatus of the type which provides a distance output signal related to the time required for an ultrasonic wave to travel from a transmitter to a receiver and, more particularly, to such apparatus for use on a fork lift truck to determine the height to which the forks are raised.

Various measuring devices in the past have been used to measure distance by means of ultrasonic wave energy. If the speed of sound in the medium through which the ultrasonic acoustic wave passes is known, the time period required for an acoustic wave to travel between an acoustic energy transmitter and an acoustic energy receiver is proportional to the distance therebetween. Such acoustic wave systems have been utilized in numerous applications including, for example, measurement of the length or thickness of a pipe or other workpiece. In many such systems, the transmitter and receiver are positioned adjacent each other with the transmitted ultrasonic wave passing through the material and being reflected from the opposite surface of the material. In such an arrangement, as shown in U.S. Pat. No. 3,554,013, issued Jan. 12, 1971, to Berg, the transit time for the ultrasonic wave energy is twice the thickness or length of the material being measured.

It is desirable to provide an arrangement which senses the height to which the forks of a fork lift truck are raised. Such a fork lift truck typically includes an extendable mast upon which a pair of forks are mounted. By operation of truck controls, the operator may lower or raise the forks.

The operator of the fork lift truck may wish to insert the forks beneath a skid or container resting on the second or third level of a container storage rack. In such an instance, the operator knows the height of the container and, therefore, knows the height to which the forks must be raised. Previous height sensing arrangements, such as shown in U.S. Pat. No. 3,319,816, issued May 16, 1967, to Christenson, have incorporated electromechanical switching arrangements in which circuit resistances are varied in dependence upon the height to which the forks are raised, with a comparison being made with resistances indicating the desired height of the forks.

A similar circuit arrangement is shown in U.S. Pat. No. 2,790,513, issued Apr. 30, 1957, to Draxler. The Draxler circuit senses when the forks are raised above a predetermined level to limit the application of power to the drive motor of the truck, thereby limiting, to a degree, the maximum speed obtainable by the truck with the forks raised. Such electromechanical height sensing arrangements generally are relatively inaccurate due to variations in the resistors and in the mechanical linkages connected to the resistors.

While ultrasonic distance measurement apparatus would provide substantially increased accuracy in determining fork height, the adverse environmental conditions in which lift trucks operate, including extraneous acoustic noise and vibration and dust and other foreign matter, have heretofore precluded the use of such an ultrasonic distance measuring arrangement on a fork lift truck for measuring fork height.

Accordingly, it is seen that there is a need for simple, reliable ultrasonic height measuring apparatus for use on a fork lift truck to measure the height of the forks, which apparatus is capable of operation under adverse environmental conditions.

SUMMARY OF THE INVENTION

A height measuring arrangement for a lift truck, having an extendable fork mast and forks mounted on the mast, for measuring the height of the forks and providing an electrical signal in response thereto, includes an electrical oscillator means for providing an ultrasonic signal. A transmitting ultrasonic transducer means is mounted on the platform in fixed position relative to the forks and is responsive to the ultrasonic signal for transmitting ultrasonic acoustic energy waves downward therefrom. An acoustic receiver means is mounted on the lift truck at a fixed height for receiving the ultrasonic acoustic energy waves from the transmitting ultrasonic transducer means and for providing an electrical output signal in response thereto. The ultrasonic receiver means includes an upward facing, substantially parabolic reflector for reflecting upwardly the acoustic energy waves transmitted downward by the transmitting ultrasonic transducer means.

The ultrasonic receiver means further comprises a downward facing receiving ultrasonic transducer for receiving acoustic energy waves reflected by the parabolic reflector and for providing the electrical output signal. The time required for the acoustic energy waves to travel from the transmitting ultrasonic transducer means to the receiving ultrasonic transducer via the parabolic reflector provides an indication of the height of the forks.

The parabolic reflector may define at least one opening therein to prevent accumulation of dirt and foreign matter. The ultrasonic receiver means may further include a hollow cylindrical receiver casing, open at the upper end thereof, means mounting the parabolic reflector within the receiver casing such that it defines a parabolic reflecting surface facing upwardly, and means mounting the downward facing, receiving ultrasonic transducer within the receiver casing substantially at the focal point of the reflector. The means mounting the downward facing receiving ultrasonic transducer may comprise spring means attached to the receiving ultrasonic transducer and to the casing such that the receiving ultrasonic transducer is isolated from vibration of the casing.

Accordingly, it is an object of the present invention to provide a height measuring arrangement for a fork lift truck to determine the height to which the forks are raised, in which an ultrasonic acoustic energy trans-transmitting transducer is mounted in fixed relation to the forks and a receiving ultrasonic transducer is mounted on the truck beneath the transmitting ultrasonic transducer; to provide such an arrangement in which the ultrasonic receiving transducer faces generally downward with ultrasonic acoustic energy waves being reflected to the receiving transducer by a wave reflecting surface; and to provide such an arrangement in which both the transmitting and receiving transducers face downwardly to prevent accumulation of dust or foreign matter on the transducer surface.

Other objects and advantages of the invention will be apparent from the following description, the accompanying drawings and the appended claims.

DETAILED DESCRIPTION OF THE PREFERRED EMBODIMENT

Figure 1:
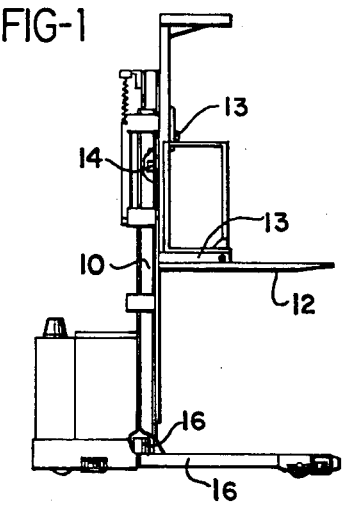
FIG. 1 is a side view of a fork lift truck incorporating apparatus according to the present invention to measure the height to which the forks are raised.

The present invention relates to an ultrasonic height measuring arrangement for a fork lift truck which measures the height of the truck forks and provides an electrical signal indicative of fork height. FIG. 1 shows a fork lift truck of conventional design incorporating the height measuring arrangement of the present invention. The fork lift truck includes an extendable fork lift mast 10 upon which a pair of forks 12 and an operator support platform 13 are mounted. By operation of truck controls, the operator may raise or lower the forks 12. Although a stock picker type truck in which the operator platform is raised with the forks is illustrated, it should be understood that the present invention may also find application in other types of trucks in which only the forks are raised.

A transmitting ultrasonic transducer means 14 is mounted on the platform 13 in fixed position relative to the forks 12 such that the transducer means 14 is raised and lowered along with the forks 12. The transducer means when appropriately energized by an ultrasonic transmit signal, projects downward a burst of ultrasonic acoustic energy waves. An ultrasonic receiver means 16 is mounted on the lift truck at a fixed height and receives the ultrasonic acoustic energy waves from the transmitting ultrasonic transducer means 14. The ultrasonic receiver means 16 provides an electrical output signal in response to receipt of the acoustic energy waves which is utilized by a circuit described below with respect to FIG. 3 to produce the desired electrical signal indicating the height of the forks. This height is directly related to the time required for the acoustic energy waves to travel from the transmitting ultrasonic transducer means 14 to the ultrasonic receiver means 16.

Figure 2:
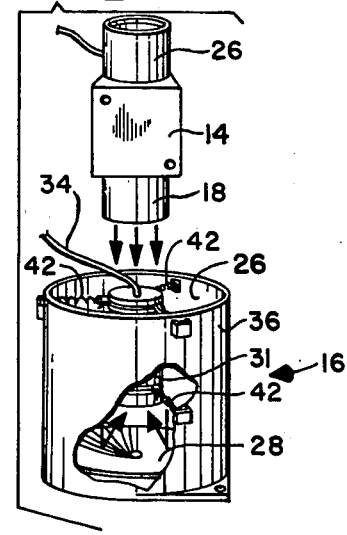
FIG. 2 illustrates a transmitting ultrasonic transducer and an ultrasonic receiver means constructed according to the present invention.
Figure 4:
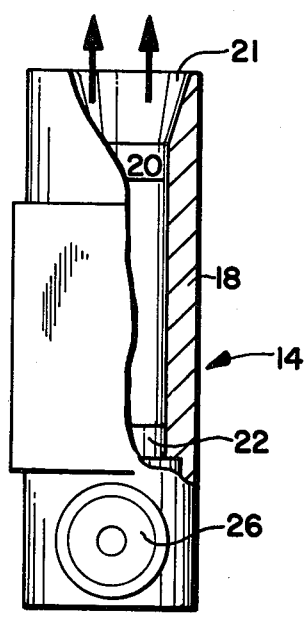
FIG. 4 is an enlarged view of the transmitting ultrasonic transducer means, with a portion broken away.
Figure 5:
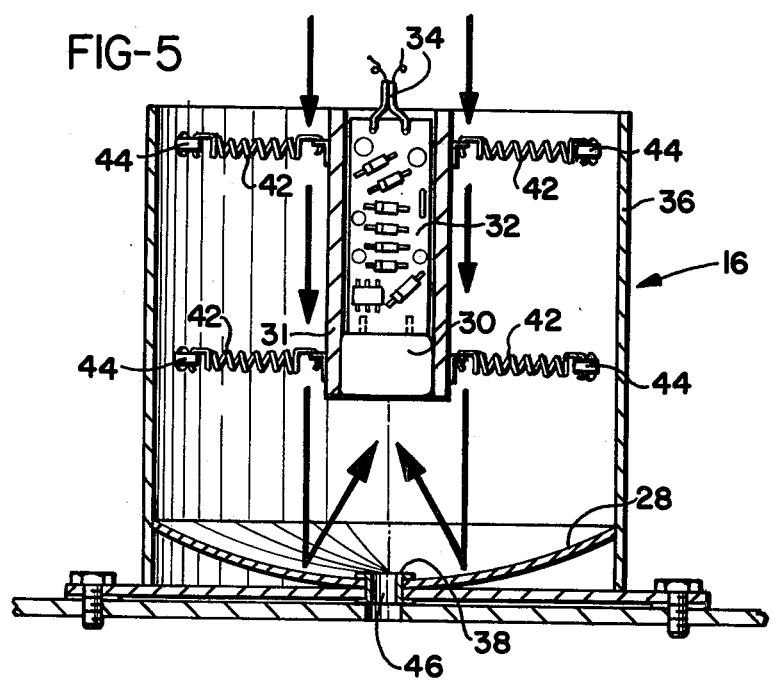
FIG. 5 is a sectional view of the ultrasonic receiver, taken generally through the central axis of the cylindrical receiver casing.

The ultrasonic receiver means and the transmitting ultrasonic transducer means are illustrated in FIGS. 2, 4, and 5. The transmitting ultrasonic transducer means 14 includes a transmitter casing 18 which defines a cavity 20 and an opening 21 communicating with the cavity. An ultrasonic transducer 22 is mounted at one end of the casing 18 and projects ultrasonic acoustic energy waves through cavity 20 and out of opening 21. A transformer 26 is electrically connected to the transducer 22 to match the impedance of the transducer with the output impedance of a circuit shown in FIG. 5 which drives transducer 22.

The ultrasonic receiver means 16 is mounted on the lift truck at a fixed height for receiving the ultrasonic acoustic energy waves from the transmitting ultrasonic transducer 14. The receiver means 16 includes an upward facing, substantially parabolic reflector 28 which may be formed of any material, such as plastic or metal, which is capable of reflecting ultrasonic acoustic energy waves. A downward facing, receiving ultrasonic transducer 30 receives the acoustic energy waves which are reflected by the parabolic reflector 28, and provides an electrical output signal in response thereto. The transducer 30 is mounted substantially at the focal point of the reflector 28 such that the acoustic energy waves are focused on the transducer, thus providing a substantial increase in the gain of the receiver. A printed circuit board 32, mounted adjacent transducer 30 in casing 31, includes a circuit on circuit board 32 which amplifies and filters the electrical output signal provided by transducer 30. The processed signal on lines 34 is then supplied to a circuit which determines the transit time of the acoustic energy wave from the ultrasonic transducer 22 to the receiving ultrasonic transducer 30 by determining the time differential between the ultrasonic transmit signal supplied to transducer 22 and the corresponding output signal from transducer 30. A height signal is produced, proportional to this transit time, which is related to the height of the forks.

The ultrasonic receiver means 16 further includes a hollow cylindrical receiver casing 36 open at the upper end thereof and means, including hollow rivet 38 mounting the parabolic reflector 28 within the casing 36 such that it defines a parabolic reflecting surface 33 facing upwardly. Transducer 30 in casing 31 is held substantially at the focal point of the reflector 28 by a spring means, including springs 42 which are attached to the casing 31 and to receiver casing 36 to provide a reduction in the vibration experienced by the transducer 30. Springs 42 engage tabs 44 which may be formed by punching the casing 36 inwardly. Springs 42 isolate the transducer 30 and the circuit on circuit board 32 from vibrations which occur during operation of the fork lift truck.

By orienting the transmitting ultrasonic transducer means 14 and the receiving transducer 30 such that both face downward, the operation of the transducers is not adversely affected by build up of dirt and other foreign material prevalent in the environment in which lift trucks operate. The reflector 28 defines at least one opening 46 therein through which dust and foreign particles dropping into casing 36 pass. Thus, the height measuring arrangement of the present invention operates reliably in even the most adverse environmental operating conditions.

FIG. 5 illustrates a circuit which provides a means for determining the transit time of the acoustic energy wave between the transmitting and receiving transducers and provides a height signal corresponding to this transit time. It should be understood that other such circuits may be utilized in the height measuring arrangement of the present invention. This circuit forms the subject of copending U.S. patent application, Ser. No. 057,921, filed on even date herewith and assigned to the assignee of the present invention.

Figure 3:
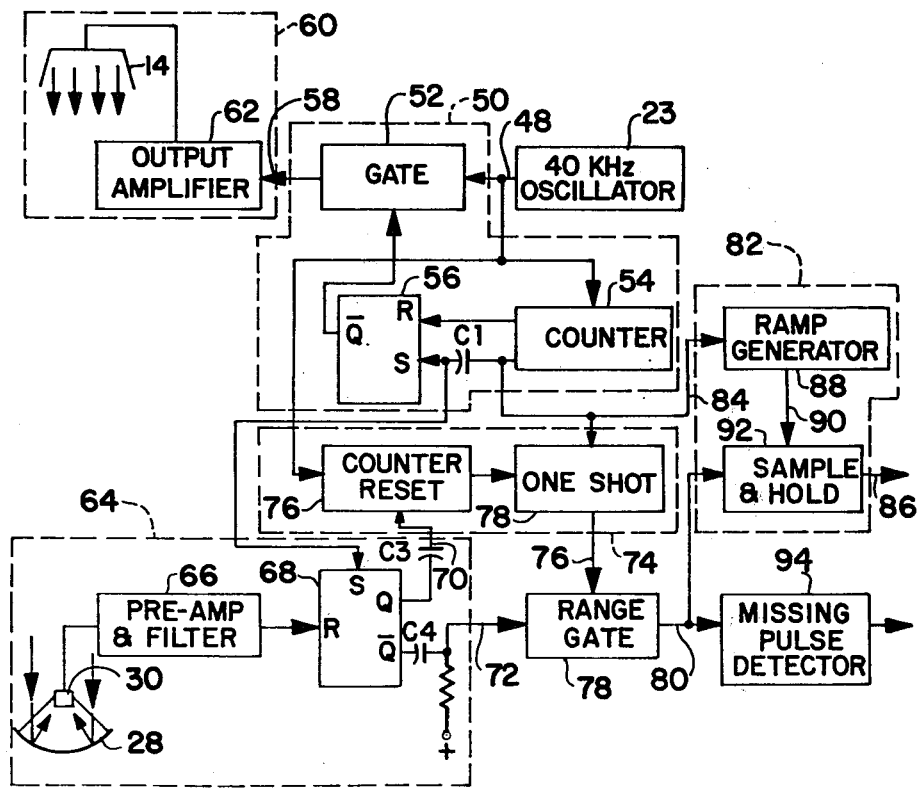
FIG. 3 is a block diagram illustrating an ultrasonic distance measuring circuit.

The circuit of FIG. 3 includes a reference oscillator 23 which provides a reference oscillator signal on line 48 at approximately 40 KHz. A burst generator means 50, including gate 52, counter 54, and flip flop 56 is responsive to the reference oscillator 23 for periodically generating ultrasonic burst signals on line 58. Ultrasonic burst signals on line 58 may comprise 40 KHz bursts, each lasting for approximately 1.6 milliseconds and occurring at the rate of 20 bursts per second. Transmitting circuit 60, including transmitting ultrasonic transducer means 14 and an output amplifier 62 is responsive to the burst generator means 50 for providing a burst of ultrasonic acoustic energy waves in response to each of the ultrasonic transmit signals defined by the burst signals on line 58.

An ultrasonic receiving circuit 64, including transducer 30, reflector 28, preamplifier and filter 66, and flip flop 68, receives the ultrasonic acoustic energy waves generated by the transducer 14 and provides detection signals on lines 70 and 72 in response thereto. A range window means 74 is responsive to the receiving circuit 64 and to the oscillator means 23 for providing a range window signal on line 76 at a time lagging each detection signal by a predetermined time period. The range window means 74 includes a counter 76 and a monostable multivibrator 78.

A range gate means 78 is responsive to the range window signal on line 76 and to the detection signal on line 72 for providing output gate signals on line 80 upon occurrence of a detection signal coincident with a range window signal. A converter means 82 is responsive to a signal on line 84 indicating the generation of an ultrasonic burst signal by burst generator means 50. The converter means 82 is further responsive to the output gate signal on line 80 for providing an output distance signal on line 86 which is related in potential to the distance between the transmitting and receiving transducers. Converter means 82 includes a ramp generator means 88 which provides a linear time varying ramp signal on line 90 in response to the occurrence of a burst signal. The sample and hold circuit 92 is responsive to the ramp signal on line 90 and to the range gate 78 for sampling the ramp signal upon the receipt of the output gate signal on line 80, thus providing an updated output distance signal equal in potential to the ramp signal at the instant of sampling.

A pulse monitor means, including missing pulse detector circuit 94, monitors the output of the range gate means 78 and provides a missing pulse signal output on line 78 upon failure of a detection signal to occur within a predetermined period of time.

In operation, gate 52 is enabled by the setting of flip flop 56 twenty times per second to pass a 1.6-millisecond burst pulse prior to resetting of flip flop 56 by counter 54. Each burst is applied to the output amplifier 62 and causes the generation of acoustic energy waves by transducer 14. Simultaneously, the ramp generator 88 is enabled and a ramp function generated on line 90. When the ultrasonic acoustic energy waves are detected by receiving circuit 64, a detection signal is supplied through the range gate 78 to circuit 82 such that the sample and hold circuit 92 then samples the ramp function on line 90. The sampled ramp function signal is, therefore, proportional in magnitude to the time between generation of a burst of ultrasonic acoustic energy waves by transducer 14 and receipt of the wave burst by transducer 30.

Range window circuit 74 and range gate 78 are provided to reduce the possibility of the circuit 82 being actuated by ultrasonic acoustic energy wave not generated by transducer 14. Range gate 78 is opened 20 times per second, with the timing of the opening of gate 78 controlled by circuit 74. Circuit 74 supplies a range window signal to gate 78 on line 76 approximately 1/20th second following the previously received detection signal.

The sampled ramp function signal on line 86 may be utilized as an input to an automatic speed control for limiting the maximum truck speed in dependence upon the height of the forks. Such a speed control circuit is shown, for instance, in copending U.S. application, Ser. No. 057,771, filed on even date herewith and assigned to the assignee of the present invention. Alternatively or additionally, the electrical signal indicating fork height may be supplied to a visual indicator, such as a voltmeter calibrated in feet, for viewing by the operator.

Whie the form of apparatus herein described constitutes a preferred embodiment of the invention, it is to be understood that the invention is not limited to this precise form of apparatus, and that changes may be made therein without departing from the scope of the invention. The positions of the positions of the transmitting transducer means and the ultrasonic receiver means may be reversed, if desired, with the transmitting transducer means mounted on the lift truck at a fixed height to transmit ultrasonic acoustic energy waves upward. In such an arrangement, the receiver means is mounted on the mast in fixed position relative to the forks with the parabolic reflector facing downward and reflecting downwardly the acoustic energy waves to an upward facing receiving ultrasonic transducer.

I claim:

1. A height measuring arrangement for a fork lift truck, having an extendable fork mast and forks mounted on said mast, for measuring the height of said forks and providing an electrical signal in response thereto, comprising:

electrical oscillator means for providing an ultrasonic signal, transmitting ultrasonic transducer means, mounted in fixed position relative to said forks and responsive to said ultrasonic signal, for transmitting ultrasonic acoustic energy waves downward therefrom, ultrasonic receiver means, mounted on said lift truck at a fixed height, for receiving said ultrasonic acoustic energy waves from said transmitting ultrasonic transducer means and for providing an electrical output signal in response thereto, said ultrasonic receiver means comprising:

an upward facing substantially parabolic reflector for reflecting upwardly said acoustic energy waves transmitted downward by said transmitting ultrasonic transducer means, and a downward facing receiving ultrasonic transducer for receiving acoustic energy waves reflected by said parabolic reflector and for providing an electrical output signal in response thereto, whereby the time required for acoustic energy waves to travel from said transmitting ultrasonic transducer means to said receiving ultrasonic transducer via said parabolic reflector provides an indication of the height of said forks.

2. The height measuring arrangement of claim 1 in which said upward facing substantially parabolic reflector defines at least one opening therein to prevent accumulation of dirt and foreign matter on said parabolic reflector.

3. The height measuring arrangement of claim 1 in which said ultrasonic receiver means further comprises a hollow cylindrical receiver casing, open at the upper end thereof, means mounting said parabolic reflector within said receiver casing such that it defines a parabolic reflecting surface facing upwardly, and means mounting said downward facing receiving ultrasonic transducer within said receiver casing substantially at the focal point of said reflector.

4. The height measuring arrangement of claim 3 in which said means mounting said downward facing receiving ultrasonic transducer comprises spring means, attached to said receiving ultrasonic transducer and to said casing, for reducing vibration experienced by said receiving ultrasonic transducer.

5. A fork height sensor for determining the height of the forks on a fork lift truck, said forks being mounted on an extendable fork mast, comprising:

a downward facing transmitting ultrasonic transducer, mounted on said mast in fixed relation to said forks, for transmitting ultrasonic acoustic energy waves downwardly in response to an ultrasonic transmit signal, an upward facing reflector, mounted on said fork lift truck beneath said transmitting ultrasonic transducer, positioned to receive ultrasonic acoustic energy waves transmitted downwardly by said transmitting ultrasonic transducer and to reflect said ultrasonic acoustic energy waves upward, a downward facing receiving ultrasonic transducer, mounted above said upward facing reflector in fixed relation thereto, for providing an output signal in response to receipt by said receiving ultrasonic transducer of ultrasonic acoustic energy waves reflected by said upward facing reflector, and means for determining the transit time of an acoustic energy wave from said transmitting ultrasonic transducer to said receiving ultrasonic transducer by determining the time differential between a transmit signal and a corresponding output signal and for providing a height signal in response thereto, which height signal is related to the height of said forks.

6. The fork height sensor of claim 5 in which said upward facing reflector means comprises means defining a parabolic wave reflecting surface, said surface being generally concave upwardly.

7. The fork height sensor of claim 6 in which said reflector means defines at least one hole therethrough such that foreign matter does not accumulate on said surface.

8. The fork height sensor of claim 5 further comprising a hollow receiver casing, open at the upper end thereof, and mounted on said truck in fixed relation to said reference level, means mounting said upward facing reflector within said receiver casing such that said reflector defines a wave reflecting surface facing upwardly, and means mounting said downward facing receiving ultrasonic transducer within said receiver casing.

9. The fork height sensor of claim 8 in which said means mounting said downward facing receiving ultrasonic transducer comprises spring means attached to said receiving ultrasonic transducer and to said casing for providing mechanical decoupling of vibrations between said casing and said receiving ultrasonic transducer.

10. The fork height sensor of claim 9 in which said spring means comprises a plurality of springs, symmetrically positioned about said downward facing receiving ultrasonic transducer and extending from said receiving ultrasonic transducer to said receiver casing such that said receiving ultrasonic transducer is positioned centrally within said casing.

11. A height measuring arrangement for a fork lift truck, having an extendable fork mast and forks mounted on said mast, for measuring the height of said forks and providing an electrical signal in response thereto, comprising:

electrical oscillator means for providing an ultrasonic signal, transmitting ultrasonic transducer means, mounted on said lift truck at a fixed height and responsive to said ultrasonic signal, for transmitting ultrasonic acoustic energy waves upward therefrom, ultrasonic receiver means, mounted on said mast in fixed position relative to said forks, for receiving said ultrasonic acoustic energy waves from said transmitting ultrasonic transducer means and for providing an electrical output signal in response thereto, said ultrasonic receiver means comprising:

a downward facing substantially parabolic reflector for reflecting downwardly said acoustic energy waves transmitted upward by said transmitting ultrasonic transducer means, and an upward facing receiving ultrasonic transducer for receiving acoustic energy waves reflected by said parabolic reflector and for providing an electrical output signal in response thereto, whereby the time required for acoustic energy waves to travel from said transmitting ultrasonic transducer means to said receiving ultrasonic transducer via said parabolic reflector provides an indication of the height of said forks.

12. The height measuring arrangement of claim 11 in which said ultrasonic receiver means further comprises a hollow cylindrical receiver casing, open at the lower end thereof, means mounting said parabolic reflector within said receiver casing such that it defines a parabolic reflecting surface facing downwardly, and means mounting said upward facing receiving ultrasonic transducer within said receiver casing substantially at the focal point of said reflector.

13. The height measuring arrangement of claim 12 in which said means mounting said upward facing receiving ultrasonic transducer comprises spring means, attached to said receiving ultrasonic transducer and to said casing, for reducing vibration experienced by said receiving ultrasonic transducer.

14. The height measuring arrangement of claim 11 in which said receiving transducer is mounted substantially at the focal point of said parabolic reflector.

* * * * *